US008924025B2

(12) United States Patent
Delorme et al.

(10) Patent No.: US 8,924,025 B2
(45) Date of Patent: Dec. 30, 2014

(54) HEATING, VENTILATING, AND AIR CONDITIONING MODULE FOR A VEHICLE

(75) Inventors: Gilles M. Delorme, Whitby (CA); Bechara E. Najm, Novi, MI (US); Mervin L. Rose, Jr., Farmington Hills, MI (US); Volker Weber, Appenheim (DE); Nedra D. McQuarters, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 374 days.

(21) Appl. No.: 13/096,628

(22) Filed: Apr. 28, 2011

(65) Prior Publication Data

US 2012/0277916 A1 Nov. 1, 2012

(51) Int. Cl.
| | |
|---|---|
| G01M 1/38 | (2006.01) |
| G05B 19/18 | (2006.01) |
| G05B 15/02 | (2006.01) |
| B64D 13/02 | (2006.01) |
| G06F 15/16 | (2006.01) |
| G06F 15/177 | (2006.01) |
| B60H 1/00 | (2006.01) |

(52) U.S. Cl.
CPC ................................. B60H 1/00642 (2013.01)
USPC .................. 700/276; 700/3; 700/10; 700/20; 454/71; 454/74; 709/208; 709/220; 709/230

(58) Field of Classification Search
CPC .............................................. H04L 2012/40234
USPC .................. 700/3, 10, 19, 20, 275, 276, 277; 701/36, 48, 49, 53; 454/71–72, 74–75; 327/415; 62/132; 709/208, 220, 230
See application file for complete search history.

(56) References Cited

U.S. PATENT DOCUMENTS

| | | | | |
|---|---|---|---|---|
| 4,562,954 A | * | 1/1986 | Kajita | 237/2 A |
| 2002/0101884 A1 | * | 8/2002 | Pohlmeyer et al. | 370/509 |
| 2004/0124706 A1 | * | 7/2004 | Suzuki et al. | 307/10.1 |
| 2004/0227402 A1 | * | 11/2004 | Fehr et al. | 307/10.1 |
| 2006/0117118 A1 | * | 6/2006 | Barrenscheen | 710/14 |
| 2006/0190144 A1 | * | 8/2006 | Ogasawara | 701/1 |
| 2007/0094528 A1 | * | 4/2007 | Fredriksson et al. | 713/375 |
| 2008/0177919 A1 | * | 7/2008 | Miyazawa | 710/110 |

(Continued)

FOREIGN PATENT DOCUMENTS

CN 201844505 U * 5/2011

OTHER PUBLICATIONS

LIN Specification Package-Revision 2.0, Local Interconnect Network, Sep. 23, 2003, pp. 1-125.

(Continued)

*Primary Examiner* — Darrin Dunn
(74) *Attorney, Agent, or Firm* — Ingrassia Fisher & Lorenz, P.C.

(57) ABSTRACT

A heating, ventilating, and air conditioning (HVAC) module for a vehicle includes an HVAC structure to accommodate a plurality of HVAC system components, the HVAC structure configured to be installed in a host vehicle. The HVAC module also includes an interconnect network with a first group of the HVAC system components and a hub component, wherein the hub component is coupled to a second group of the HVAC system components. An HVAC module connector is coupled to the interconnect network to establish data connectivity between the interconnect network and an electronic control module of the host vehicle.

17 Claims, 3 Drawing Sheets

(56) References Cited

U.S. PATENT DOCUMENTS

| | | | |
|---|---|---|---|
| 2009/0021919 A1* | 1/2009 | Gaynier et al. | 361/728 |
| 2009/0059908 A1* | 3/2009 | Xu et al. | 370/356 |
| 2009/0292841 A1* | 11/2009 | Weser et al. | 710/106 |
| 2009/0307400 A1* | 12/2009 | Machauer et al. | 710/110 |
| 2010/0138472 A1* | 6/2010 | Takashima | 709/202 |
| 2010/0274451 A1* | 10/2010 | Hiruma | 701/48 |
| 2010/0291853 A1* | 11/2010 | Koshobu | 454/155 |
| 2010/0318235 A1* | 12/2010 | Moss | 700/295 |
| 2010/0327796 A1* | 12/2010 | Koshobu | 318/625 |
| 2011/0033190 A1* | 2/2011 | Veilleux et al. | 398/117 |
| 2011/0106333 A1* | 5/2011 | Scheider et al. | 701/1 |
| 2011/0153898 A1* | 6/2011 | Krempasky, II | 710/306 |
| 2011/0241847 A1* | 10/2011 | Baruco et al. | 340/12.5 |

OTHER PUBLICATIONS

LIN Network for Vehicle Applications, SAE International-Surface Vehicle Recommended Practice, Sep. 2005, pp. 1-45.

* cited by examiner

HEATING, VENTILATING, AND AIR CONDITIONING MODULE FOR A VEHICLE

TECHNICAL FIELD

Embodiments of the subject matter described herein relate generally to a climate control system for a vehicle. More particularly, embodiments of the subject matter relate to a local interconnect network architecture for use with a heating, ventilating, and air conditioning (HVAC) module for a vehicle.

BACKGROUND

Vehicles such as automobiles usually include a climate control or HVAC system, which may be manually and/or automatically controlled. Most modern vehicles employ electronic control technologies to control the operation of their HVAC systems. One or more onboard electronic control modules (ECMs) are deployed to support a variety of electronic HVAC components, such as blowers, actuators, temperature sensors, heater elements, and the like. To simplify manufacturing of the vehicle, the various HVAC components can be assembled together into an integrated HVAC module, which can be quickly and easily installed into the host vehicle.

A number of electronic control and data communication techniques and technologies are utilized in connection with the deployment of an HVAC module for a vehicle. For example, some HVAC components may generate analog sensor signals that must be detected and processed, and other HVAC components may support digital data communication and networking protocols. In Europe, for example, a proprietary control and communication protocol known as "COOLING" is used in many vehicle HVAC systems. Although the COOLING protocol is satisfactory for deployment in Europe, it does not meet some of the stricter operating requirements mandated in other countries such as the United States.

BRIEF SUMMARY

A heating, ventilating, and air conditioning (HVAC) module for a vehicle is provided. An exemplary embodiment of the HVAC module includes: an HVAC structure to accommodate a plurality of HVAC system components; an interconnect network with a first group of the plurality of HVAC system components and a hub component, wherein the hub component is coupled to a second group of the plurality of HVAC system components; and an HVAC module connector coupled to the interconnect network, the HVAC module connector configured to establish data connectivity between the interconnect network and an electronic control module of the host vehicle.

Another exemplary embodiment of an HVAC module is also provided. This embodiment of the HVAC module includes: an HVAC module connector to establish data connectivity between an electronic control module of a host vehicle and a local interconnect network (LIN) of the HVAC module; a sensor hub component coupled to the HVAC module connector, the sensor hub component having a LIN transceiver to support LIN data communication; and a plurality of analog sensor components coupled to the sensor hub component to provide analog sensor signals to the sensor hub component for processing and converting into corresponding sensor data compatible with the LIN.

A climate control module for a vehicle is also provided. An exemplary embodiment of the climate control module includes: a data transport link to accommodate data communication for a LIN; a plurality of LIN-compatible components, each having a respective LIN transceiver to communicate with the data transport link, and each configured to support at least one function of the climate control module; a LIN-compatible hub component having a respective LIN transceiver to communicate with the data transport link; and a plurality of non-LIN-compatible components communicatively coupled to the LIN-compatible hub component, each of the non-LIN-compatible components configured to support at least one function of the climate control module.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The subject matter presented here relates to an electrical and data communication architecture suitable for use with a LIN-based HVAC module for a vehicle such as an automobile. The HVAC module can be fabricated in an integrated fashion as a single deployable unit, which in turn can be installed into the host vehicle chassis at an appropriate point in the vehicle manufacturing timeline. In practice, the HVAC module can be fabricated as a standalone unit by a vendor or supplier, using the specifications and requirements designated by the vehicle manufacturer. As will become apparent from the following description, the HVAC module is scalable such that the HVAC module suppliers can introduce any combination and number of HVAC components into the module (e.g., actuators, blowers, sensors, etc.) to meet the vehicle requirements without impacting the release of the HVAC electronic control unit (ECU) on the vehicle. Although the specific configuration of the HVAC module might vary to accommodate different vehicle platforms and/or families, the physical and electrical connection to the vehicle can be designed to be globally common for mating with any ECU.

Figure 1:
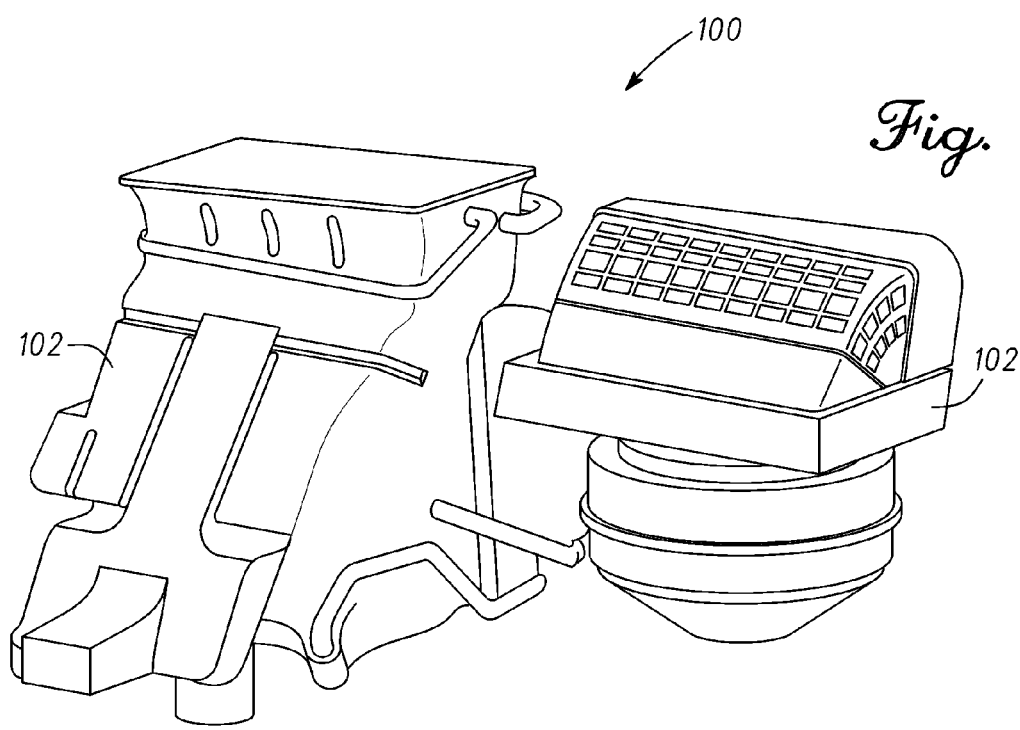
FIG. 1 is a perspective view of an exemplary embodiment of an HVAC module suitable for deployment in a vehicle such as an automobile.

FIG. 1 is a perspective view of an exemplary embodiment of an HVAC module 100 suitable for deployment in a vehicle such as an automobile. It should be appreciated that the HVAC module 100 depicted in FIG. 1 is merely one possible implementation that is intended for installation in a particular vehicle platform, model, or family, and that the actual shape, size, and configuration of a given HVAC module can vary to suit the needs of the host vehicle. The HVAC module 100 employs an HVAC structure 102 as its physical foundation. The HVAC structure 102 may include any number of cooperating shells, housings, compartments, or bodies as needed to accommodate a plurality of HVAC components (hidden from view in FIG. 1). The various HVAC components are controlled and operated as needed or required to carry out various climate control functions for the host vehicle. The HVAC module 100 may be installed into the host vehicle as a single unit, or it could be assembled in the host vehicle in a piecemeal manner.

Figure 2:
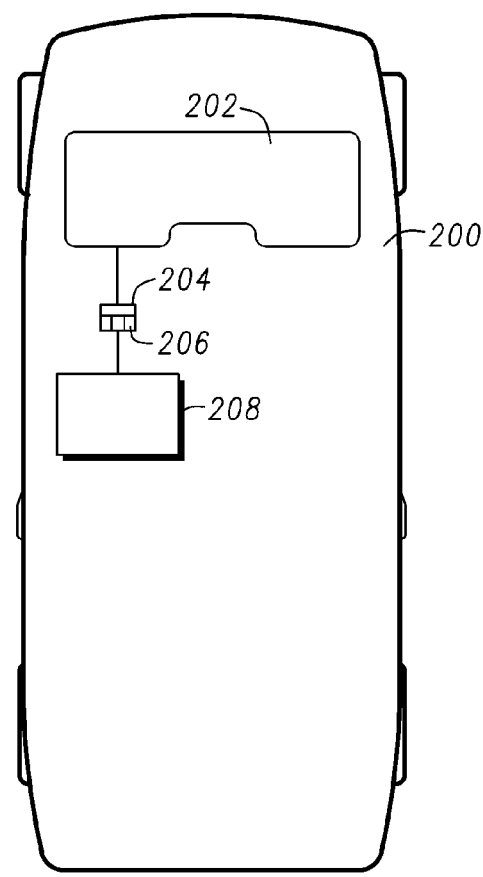
FIG. 2 is a schematic representation of a vehicle having an HVAC module.

FIG. 2 is a schematic representation of an automobile 200 having an HVAC module 202 installed therein. The HVAC module 202 may include any number of HVAC module connectors for establishing electrical and data connectivity with one or more other components or elements onboard the host vehicle 200. The illustrated embodiment has only one HVAC module connector 204, which is considered to be an integral part of the HVAC module 202. The HVAC module connector 204 can accommodate any desired number of electrical conductors (e.g., wires, leads, metal traces, or the like) corresponding to various voltage terminals, input/output ports, signal nodes, or the like. The HVAC module connector 204 is designed for mating with a corresponding connector 206, which in turn is coupled to an ECU 208 of the host vehicle 200. As described in more detail below, the HVAC module connector 204 is coupled to an interconnect network architecture (e.g., a LIN topology) to establish data connectivity between the interconnect network architecture and the ECU 208 of the host vehicle 200. In this regard, the HVAC module connector 204 may be considered to be a data transport link for one or more LINs onboard the host vehicle 200. In practice, the HVAC module connector 204 may be designed to accommodate and support a plurality of LIN circuits, one or more legacy HVAC components, one or more supply voltage leads, one or more ground or reference voltage leads, and the like.

Figure 3:
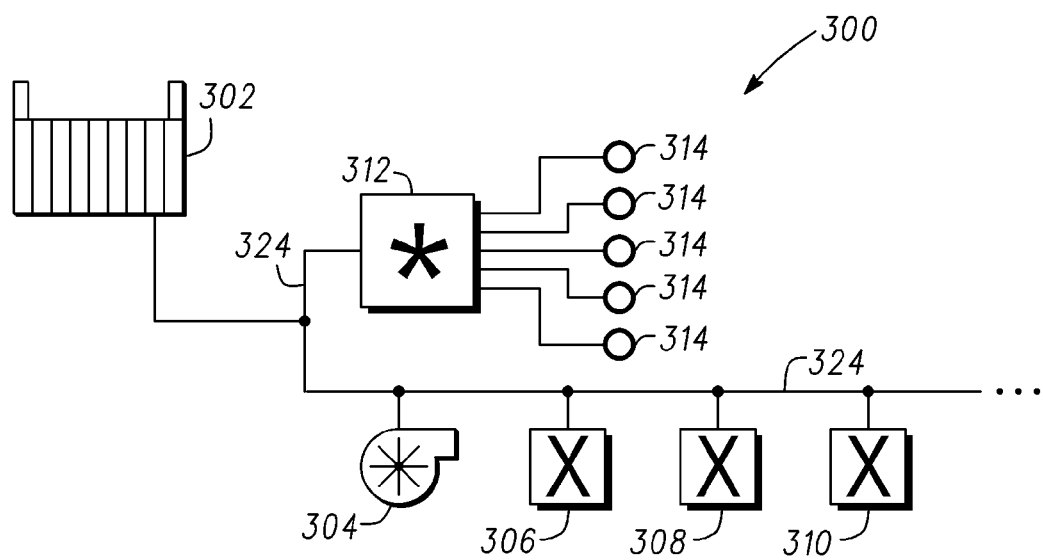
FIG. 3 is a schematic representation of an exemplary embodiment of an HVAC module that employs a local interconnect network (LIN) architecture.

The number, type, configuration, and layout of HVAC components in an HVAC module might vary from one vehicle to another. FIG. 3 is a schematic representation of one non-limiting and non-exhaustive embodiment of an HVAC module 300 that employs a LIN architecture. This particular embodiment of the HVAC module 300 includes, without limitation: an HVAC module connector 302; a plurality of LIN-compatible HVAC components (e.g., a LIN-compatible blower 304, and three LIN compatible actuators 306, 308, 310); a LIN-compatible hub component 312; and a plurality of non-LIN-compatible HVAC components (e.g., analog sensors 314). Each of the HVAC components is configured and operated to support at least one function, feature, or aspect of the HVAC module 300. Although not shown in FIG. 3, the HVAC module 300 may also include other LIN-compatible and/or non-LIN-compatible components if so desired. For example, the HVAC module 300 may include one or more non-LIN-compatible heater components, one or more non-LIN-compatible blowers, one or more non-LIN-compatible actuators, or the like. In practice, the analog sensors 314 may be realized as any type of sensor or detector commonly used with HVAC systems. For example, any of the following sensor types may be used, without limitation: duct temperature sensor; evaporator temperature sensor; air quality sensor; outside air temperature sensor; humidity sensor; solar/light sensor; or the like.

For this particular example, the LIN architecture is defined to include at least the plurality of LIN-compatible HVAC components, the LIN-compatible hub component 312, and the interconnect fabric 324 (which may be realized as any data transport link, a physical channel, one or more physical electrical conductors, or the like) that serves to couple the LIN-compatible elements together. The HVAC module connector 302 (or a portion thereof) may also be considered to be a part of the LIN architecture. In certain embodiments, the LIN architecture and all of the LIN-compatible components are compliant with the LIN 2.0 protocol, as modified by SAE J2602-1. Various LIN protocols are available from the LIN Consortium and via the internet at the website www.lin-subbus.de (the content of the LIN protocols is incorporated by reference herein).

LIN-compatible HVAC actuators and LIN-compatible HVAC blowers on the market today do not meet North American electromagnetic compatibility (EMC) requirements. Moreover, traditional non-LIN-based HVAC module designs are constrained by the input/output limitations of the ECU to which the HVAC module is connected (for example, a maximum of seven HVAC actuators and six temperature sensors). In this regard, a conventional ECU that supports an HVAC module has a large number of inputs/outputs that are dedicated to the HVAC module, resulting in a high count of wires and connections.

The HVAC modules presented here address many, if not all, of the shortcomings of existing HVAC module designs. For example, the HVAC modules can be designed to satisfy the North American EMC requirements by implementing a star topology (instead of a daisy chain approach), utilizing a fixed communication baud rate (instead of a variable rate), and using LIN transceivers that have been validated or that conform to the LIN 2.0 protocol, as modified by SAE J2602-1, instead of a supplier proprietary ASIC. Generally, with respect to EMC, if a LIN part is designed to meet the LIN 2.0 specification as modified by the SAE J2602-1 requirements, it will have a better chance of passing the strict North American EMC test requirements, which are not always in place in the counterpart European EMC test requirements.

Moreover, the ECU for the HVAC module will not impose any constraints on the design or configuration of the HVAC module itself, resulting in more flexibility in the design of the HVAC module. In this regard, a particular HVAC module could include LIN-compliant components and/or non-LIN-compliant components, which increases the number of supplier options. In addition, the LIN architecture employed by the HVAC module allows the number of dedicated inputs/outputs on the HVAC electronic control unit to be significantly reduced, which in turn reduces the number of electrical circuits routed between the HVAC module and the HVAC electronic control unit. Reduction in physical conductors is achieved at least in part by the star topology, which can be deployed using a single electrical conductor (which serves as the data input and data output path) per LIN-compliant component, as described further below.

Referring again to FIG. 3, the LIN architecture of the HVAC module 300 generally includes a first group of "digital" HVAC components (namely, the LIN-compatible components) and the LIN-compatible hub component 312. In certain embodiments, each of the LIN-compatible HVAC components and the LIN-compatible hub component 312 has a respective LIN identifier that is unique within the domain of the LIN. This identification scheme enables elements of the LIN to determine the source or origin of data flowing throughout the LIN.

The LIN-compatible hub component 312 in turn is coupled to a second group of HVAC components (namely, the non-LIN-compatible analog sensors 314). Notably, the LIN architecture of the HVAC module 300 is arranged in a star topology. In other words, the LIN-compatible hub component 312, the blower 304, and each of the actuators 306, 308, 310 are coupled to a common network node that corresponds to the interconnect fabric 324. In practice, each LIN-compatible component utilizes a single conductor (e.g., a wire) that serves as its LIN input/output connection. This configuration enables the HVAC module 300 to communicate with the rest of the vehicle using only a LIN interface if so desired. Accordingly, all of the electronic devices of the HVAC module 300 are directly or indirectly coupled to the LIN, and are therefore connected to the host vehicle using the respective LIN circuit and the HVAC module connector 302. Notably, the HVAC module connector 302 need not be dedicated to any particular ECU on the host vehicle. Rather, the HVAC module connector 302 could be realized as a "generic" connector that is globally compatible with different ECUs, which may be programmed as needed to support the intended HVAC system functionality.

Figure 4:
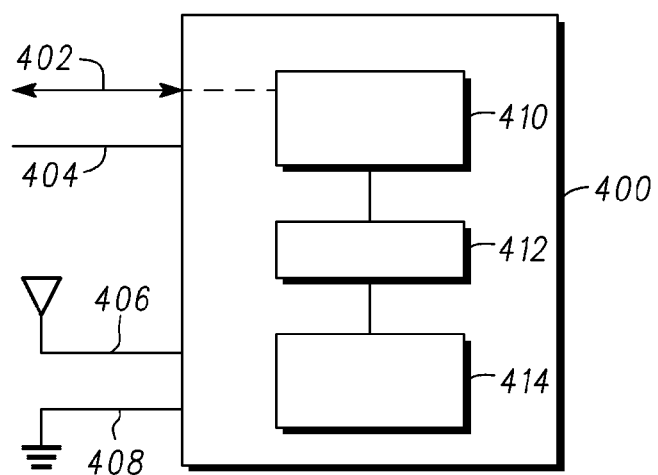
FIG. 4 is a schematic representation of an exemplary embodiment of a LIN-compatible HVAC component.

As depicted in FIG. 3, each of the LIN-compatible components is directly connected to the LIN, preferably using a single electrical conductor. In practice, each of the LIN-compatible components may be configured in accordance with known LIN techniques and protocols. In this regard, FIG. 4 is a schematic representation of an exemplary embodiment of a LIN-compatible component 400. The component 400 may represent a LIN-based actuator, blower, sensor, heater, hub, interface, or the like. The illustrated embodiment of the LIN-compatible component 400 includes four terminals, ports, or connections, which are utilized for: a LIN input/output 402; an address ground (or reference) 404; a supply voltage 406; and a ground or reference voltage 408. The LIN-compatible component 400 includes a LIN transceiver 410 to support LIN data communication, a processor 412 or suitably designed processing logic, and various elements and functions 414 associated with the native functionality and operation of the LIN-compatible component 400 (e.g., hardware, software, and/or firmware associated with an HVAC actuator, an HVAC blower, a sensor, a heater, or the like).

In contrast to a typical device using the traditional COOLING protocol (which employs separate LIN input and LIN output ports), the LIN-compatible component 400 includes a combined LIN input/output 402. The combined LIN input/output 402 enables the establishment of the node address for each LIN-based component in the network, and facilitates a star topology. In certain embodiments, the network assumes that each LIN-based component is programmed to have a default node address (e.g., 0x61) and is programmed to also have an alternate node address. By default, a given LIN-based device will not have the address ground 404 grounded and, by default, will communicate on the LIN bus using its default node address. If a second LIN device is required, then the same device will be installed and will have its address ground 404 connected to ground, forcing the device to use its alternate node address.

The processor 412 is suitably configured to support the functionality of the LIN-compatible component 400, and to carry out the various tasks, methods, and processing steps described herein. The processor 412 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In practice, the processor 412 may be realized as a microprocessor, a controller, a microcontroller, or a state machine. The processor 412 supports data communication using the LIN, and supports the native elements and functions 414 during operation of the HVAC system. In certain implementations, the processor 412 facilitates operation in compliance with the published LIN 2.0 protocol.

Referring again to FIG. 3, the LIN-compatible HVAC components (i.e., the blower 304 and the actuators 306, 308, 310) support LIN-based data communication with the ECU to which the HVAC module connector 302 is attached. Such LIN-based data communication may be performed in accordance with well known and established LIN protocols, standards, and techniques that will not be described in detail here. The HVAC module 300 also includes a number of legacy or otherwise non-LIN-compatible components (i.e., the analog sensors 314). The LIN-based hub component 312 functions as an interface, a translator, or a converter between the LIN domain and the non-LIN domain. In other words, the LIN-based hub component 312 communicates with the non-LIN-compatible components using analog techniques, non-LIN techniques, or the like. Accordingly, it may be necessary for the hub component 312 to support a plurality of different non-LIN data communication, signal processing, and control protocols as needed for operation with the various non-LIN-compatible components.

In certain embodiments, the hub component 312 receives analog sensor signals from the analog sensors 314 processes the received analog sensor signals, and generates corresponding sensor data for transmission using the LIN. Thus, the hub component 312 may function to translate or convert analog HVAC sensor data into a digital data format suitable for communication using the LIN transceiver of the hub component 312. In some embodiments, the hub component 312 may also be designed to communicate with non-LIN-compatible components other than analog sensors. In such an implementation, the hub component 312 could support bidirectional communication with a non-LIN-compatible component if needed for purposes of control, activation, or initiation of the non-LIN-compatible component, and for purposes of receiving analog signals or data from the non-LIN-compatible component. For example, the hub component 312 could serve as an interface between the analog sensors 314, one or more legacy (non-LIN-compatible) blowers, one or more legacy actuators, one or more analog HVAC components, and/or any legacy HVAC component. In this context, the hub component 312 may be considered to be a legacy hub component that facilitates use of legacy HVAC components in the context of a LIN-based architecture.

Figure 5:
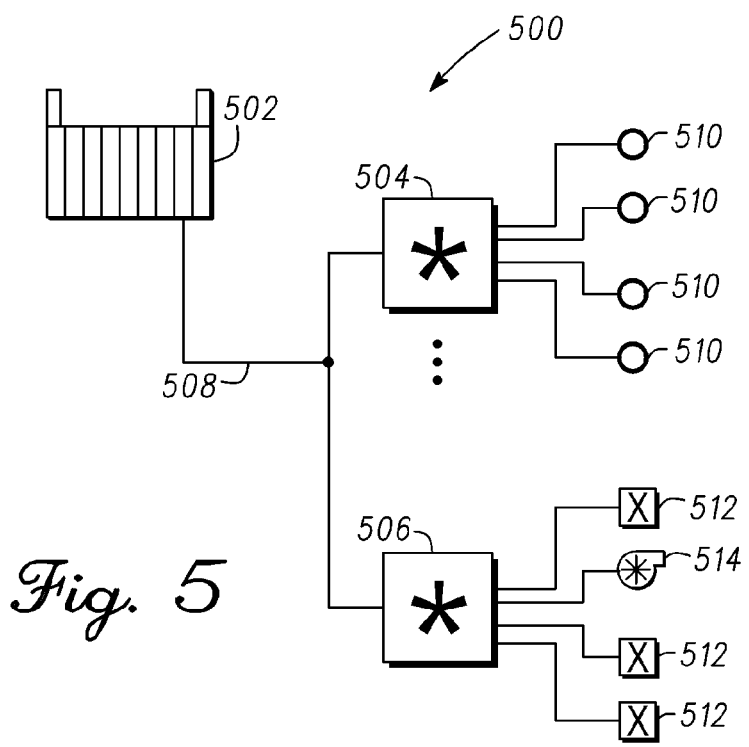
FIG. 5 is a schematic representation of another exemplary embodiment of an HVAC module that employs a LIN architecture.

The exemplary HVAC module 300 depicted in FIG. 3 represents one embodiment where a hub component is utilized as a bridge between the LIN architecture and a number of analog sensors. In practice, an embodiment of an HVAC module may utilize a different network topology. For example, FIG. 5 is a schematic representation of another exemplary embodiment of an HVAC module 500 that employs a LIN architecture. The HVAC module 500 includes an HVAC module connector 502, which is communicatively coupled to a plurality of hub components: a LIN-compatible sensor hub component 504; and a LIN-compatible legacy hub component 506. The ellipses in FIG. 5 indicate that the HVAC module 500 may include any number of additional hub components if needed or desired. The HVAC module connector 502, the sensor hub component 504, and the legacy hub component 506 are interconnected via a suitable interconnect fabric 508. As described above for the HVAC module 300, the sensor hub component 504 is exclusively used to communicate with a plurality of analog sensors 510.

The legacy hub component 506 provides an interface between the ECU of the host vehicle (the ECU is not shown in FIG. 5) and at least one legacy or analog HVAC component. The illustrated embodiment of the HVAC module 500 includes four legacy HVAC components: three analog HVAC actuators 512; and an analog HVAC blower 514. The legacy hub component 506 controls the operation of the legacy HVAC components in a traditional manner, under the supervision of the onboard ECU. In this regard, the legacy hub component 506 may react, respond, or otherwise be influenced by LIN-based control signals received from the ECU of the host vehicle. Moreover, the legacy hub component 506 may be designed and configured to receive analog signals from the legacy HVAC components for processing and converting into corresponding LIN-based data for transmission within the LIN and/or for transmission to the onboard ECU.

Notably, the HVAC module 500 has no LIN-compatible HVAC components directly connected to the interconnect fabric 508. Rather, all of the HVAC components (i.e., the analog sensors 510, the analog HVAC actuators 512, and the analog HVAC blower 514) are indirectly coupled to the interconnect fabric 508 via either the sensor hub component 504 or the legacy hub component 506. As mentioned previously, the sensor hub component 504 and the legacy hub component 506 are both LIN-compatible to accommodate digital data communication with one or more ECUs onboard the host vehicle.

Figure 6:
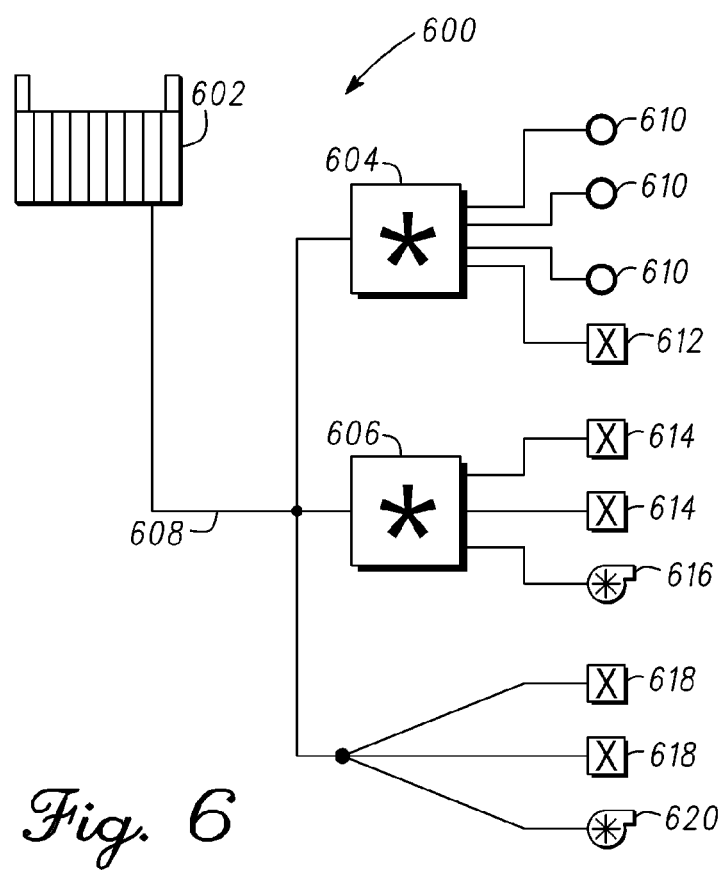
FIG. 6 is a schematic representation of yet another exemplary embodiment of an HVAC module that employs a LIN architecture.

FIG. 6 is a schematic representation of yet another exemplary embodiment of an HVAC module 600 that employs a LIN architecture. The HVAC module 600 utilizes a "hybrid" topology similar to that utilized by the HVAC module 300. The HVAC module 600 includes an HVAC module connector 602, which is communicatively coupled to a LIN-compatible sensor hub component 504 and to a LIN-compatible hub component 606. The HVAC module connector 602, the hub component 604, and the hub component 606 are interconnected via a suitable interconnect fabric 608. The HVAC module connector 602 can be used to connect the HVAC module 600 to an ECU (not shown) onboard the host vehicle.

The hub component 604 is communicatively coupled to a plurality of analog sensors 610 and to at least one analog HVAC actuator 612. In contrast to the embodiments describe previously, the hub component 604 is not reserved for or exclusively used for analog sensors. Indeed, the hub component 604 may also support other analog HVAC components if needed or desired, e.g., an auxiliary heater element, an analog HVAC blower, etc. The hub component 604 functions as described above to support the operation of the non-LIN-compatible HVAC components to which it is coupled.

The hub component 606 is communicatively coupled to a plurality of analog HVAC actuators 614 and to an analog HVAC blower 616. It should be understood that the hub component 606 may also support any number of analog HVAC components if needed or desired, e.g., an auxiliary heater element, additional analog HVAC blowers, analog sensors, etc. The hub component 606 functions as described above to support the operation of the non-LIN-compatible HVAC components to which it is coupled.

The HVAC module 600 also includes a number of digital HVAC components that are directly coupled to the LIN via the interconnect fabric 608. For this particular example, the digital HVAC components include, without limitation: two digital HVAC actuators 618, and a digital HVAC blower 620. As depicted in FIG. 6, these LIN-compatible HVAC components may be directly coupled to the HVAC module connector 602 to support LIN data communication with an onboard ECU.

The exemplary embodiments described above demonstrate how a LIN-based HVAC module can be flexibly configured in various topologies to leverage modern LIN-compatible HVAC components and/or legacy non-LIN-compatible HVAC components. Moreover, these embodiments do not rely on a "daisy chain" arrangement of LIN-compatible components (which may not be as robust and error-free as the described star topologies). In practice, each LIN circuit requires only one electrical lead to the ECU. Accordingly, the number of conductors and electrical connections can be significantly reduced, relative to legacy systems having a point-to-point arrangement between the ECU and the HVAC components.

An HVAC module having the characteristics and functionality described above derives certain benefits of using the LIN 2.0 protocol as modified by the SAE J2602-1 standard. These benefits include, without limitation: a single bit rate (e.g., 10.417 kbps) can be validated for performance stability; the consistent location of slave status information simplifies network management software; EMC performance meets North American requirements; diagnostic commands are not required; allows star connected topologies; wide availability of LIN transceivers and integrated circuits; simplified addressing scheme where message identifiers are assigned to specific node addresses; utilizing a single connection to ground to effect multiple node addresses; defined slave behavior in the presence of network faults; and protected message identifiers and checksum calculation includes the protected identifier.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A heating, ventilating, and air conditioning (HVAC) module for a vehicle, the HVAC module comprising:
an HVAC structure to accommodate a plurality of HVAC system components, the HVAC structure configured to be installed in a host vehicle;
an interconnect network comprising a first group of the plurality of HVAC system components and a hub component, arranged in a star topology using a local interconnect network (LIN) architecture,
wherein the first group comprises a plurality of LIN-compatible HVAC system components;
wherein the first group and the hub component are coupled to an interconnect fabric, the interconnect fabric comprising a data transport link and at least one physical electrical conductor;
wherein the hub component is coupled to a second group of the plurality of HVAC system components, the second group comprising analog sensor components; and
an HVAC module connector coupled to the interconnect fabric of the interconnect network, wherein the HVAC module connector is configured to:
establish data connectivity between the interconnect network and an electronic control module of the host vehicle; and
accommodate and support a plurality of LIN circuits.

2. The HVAC module of claim 1, wherein the LIN architecture is compliant with standard SAE J2602.

3. The HVAC module of claim 1, wherein the hub component processes analog sensor signals received from the analog sensor components to generate corresponding sensor data for transmission using the interconnect network.

4. A heating, ventilating, and air conditioning (HVAC) module for a vehicle, the HVAC module comprising:
an HVAC module connector to establish data connectivity between an electronic control module of a host vehicle and a local interconnect network (LIN) of the HVAC module, the HVAC module connector configured to accommodate a plurality of LIN circuits;
a sensor hub component coupled to the HVAC module connector via an interconnect fabric of the LIN, the sensor hub component comprising a LIN transceiver to support LIN data communication;
a plurality of LIN-compatible HVAC components coupled to the interconnect fabric of the LIN; and
a plurality of analog sensor components coupled to the sensor hub component to provide analog sensor signals to the sensor hub component for processing and converting into corresponding sensor data compatible with the LIN.

5. The HVAC module of claim 4, further comprising an HVAC component coupled to the HVAC module connector, the HVAC component comprising a LIN transceiver to support LIN data communication.

6. The HVAC module of claim 4, further comprising:
a legacy hub component coupled to the HVAC module connector, the legacy hub component comprising a LIN transceiver to support LIN data communication; and
at least one legacy HVAC component coupled to the legacy hub component, wherein the legacy hub component provides an interface between the electronic control module of the host vehicle and the at least one legacy HVAC component.

7. The HVAC module of claim 6, wherein the legacy hub component controls operation of the at least one legacy HVAC component in response to LIN-based control signals received from the electronic control module of the host vehicle.

8. The HVAC module of claim 6, wherein the legacy hub component receives analog signals from the at least one legacy HVAC component for processing and converting into corresponding LIN-based data.

9. The HVAC module of claim 4, further comprising a digital HVAC component coupled to the HVAC module connector, the digital HVAC component comprising a LIN transceiver to support LIN data communication.

10. A climate control module for a vehicle, the climate control module comprising:
a data transport link to accommodate data communication for a local interconnect network (LIN);
a plurality of LIN-compatible components, each having a respective LIN transceiver to communicate with the data transport link, and each configured to support at least one function of the climate control module;
a LIN-compatible hub component having a respective LIN transceiver to communicate with the data transport link;
a plurality of non-LIN-compatible components communicatively coupled to the LIN-compatible hub component, each of the non-LIN-compatible components configured to support at least one function of the climate control module; and
a climate control module connector to establish data connectivity between an electronic control module of the vehicle and the data transport link of the climate control module, the climate control module connector configured to accommodate a plurality of LIN circuits.

11. The climate control module of claim 10, wherein:
the data transport link comprises a physical electrical conductor; and
the climate control module further comprises a connector to establish data connectivity with an electronic control module of the vehicle.

12. The climate control module of claim 10, wherein the plurality of LIN-compatible components and the LIN-compatible hub component are arranged in a star topology.

13. The climate control module of claim 10, wherein the plurality of non-LIN-compatible components comprises a plurality of analog sensor components.

14. The climate control module of claim 13, wherein the LIN-compatible hub component controls operation of the analog sensor components in response to control data received from the data transport link.

15. The climate control module of claim 13, wherein the LIN-compatible hub component processes analog sensor signals received from the analog sensor components to generate corresponding sensor data for transmission using the LIN.

16. The climate control module of claim 10, wherein each of the plurality of LIN-compatible components and the LIN-compatible hub component has a respective LIN identifier that is unique within the domain of the LIN.

17. The HVAC module of claim 10, wherein the LIN is compliant with standard SAE J2602.

* * * * *